United States Patent [19]
Isobe et al.

[11] Patent Number: 4,670,340
[45] Date of Patent: Jun. 2, 1987

[54] MAGNETIC RECORDING MEDIUM AND METHOD

[75] Inventors: Yukihiro Isobe, Usuda; Kazushi Tanaka; Masaharu Nishimatsu, both of Komoro; Osamu Shinoura, Saku; Yuichi Kubota, Komoro, all of Japan

[73] Assignee: TDK Corporation, Tokyo, Japan

[21] Appl. No.: 767,075

[22] Filed: Aug. 19, 1985

Related U.S. Application Data

[63] Continuation of Ser. No. 659,015, Oct. 9, 1985, abandoned, which is a continuation of Ser. No. 383,528, Jun. 1, 1982, abandoned.

[30] Foreign Application Priority Data

Jun. 5, 1981 [JP] Japan ................................. 56-85688

[51] Int. Cl.⁴ ............................................. B32B 5/16
[52] U.S. Cl. ................................. 428/339; 427/44; 427/128; 427/130; 428/694; 428/900
[58] Field of Search .................... 427/44, 128, 130; 428/339, 694, 900

[56] References Cited

U.S. PATENT DOCUMENTS

| | | | |
|---|---|---|---|
| 3,293,066 | 12/1966 | Haines | 117/68 |
| 3,617,378 | 11/1971 | Beck | 117/226 |
| 3,881,046 | 4/1975 | Akashi et al. | 428/469 |
| 4,260,466 | 4/1981 | Shirahata et al. | 427/132 X |
| 4,309,482 | 1/1982 | Suzuki et al. | 428/900 X |
| 4,335,183 | 6/1982 | Hosaka | 428/900 X |
| 4,343,831 | 8/1982 | Tsusi et al. | 427/130 X |

FOREIGN PATENT DOCUMENTS 54-123923 9/1979 Japan.

*Primary Examiner*—Bernard D. Pianalto
*Attorney, Agent, or Firm*—Wyatt, Gerber, Shoup, Scobey and Badie

[57] ABSTRACT

The invention provides a method for manufacturing a magnetic recording tape which is free from the problems of the phenomenon of dropout as well as runout of the tape roll throughout the life of the tape. The inventive method comprises providing a coating layer on a surface of a film base of the tape having been provided with the magnetic coating layer on the other surface with a coating composition comprising a radiation-sensitive curable polymeric material, which is a thermoplastic resin modified to be radiation-sensitive with or without admixture of a thermoplastic elastomer, and a filler dispersed therein and, prior to winding of the tape into a roll, irradiating the coating layer with a high energy radiation of, preferably, electron beams whereby the coating composition is fully radiation-cured to form a backing layer of the tape.

8 Claims, 2 Drawing Figures

MAGNETIC RECORDING MEDIUM AND METHOD

This application is a continuation of Ser. No. 659,015, filed Oct. 9, 1985, which is a continuation of Ser. No. 383,528, filed June 1, 1982, both now abandoned.

BACKGROUND OF THE INVENTION

The present invention relates to a magnetic recording medium such as a magnetic recording tape used in audio instruments, video instruments and computers. More particularly, the invention relates to a magnetic recording medium having an improved backing layer on the reverse side of the film base to the magnetic layer with which the output fluctuation in the playing of the magnetic recording medium can be remarkably decreased and the runout of the travelling magnetic recording tape can be minimized.

Needless to say, magnetic recording tapes are widely used as a means for information recording in the field of electronics including audio and video technologies as well as computer technologies. Along with the progress of the information processing technology by use of magnetic recording tapes, the amount of information recorded on such magnetic recording tapes is rapidly increasing year by year so that it is an urgent requirement for magnetic recording tapes that the recording density of the information on the tape should be as high as possible.

Usually, short-wavelength recording is undertaken to ensure high-density recording but this way of recording is subject to the problem of dropout, which is a phenomenon of infidelity in the readout of the information recorded on the magnetic recording tape by skipping pulses indispensable for the reproduction of the information with high fidelity.

Such a phenomenon of dropout is caused mainly by the instantaneous or momentary increase of the spacing loss between the magnetic recording tape and the magnetic head of the playback instrument. The spacing loss therebetween is expressed by the formula $54.6d/\lambda[dB]$, in which d is the distance between the tape and the magnetic head and $\lambda$ is the wavelength of recording. As is understood from this formula, the spacing loss is much larger in the short-wavelength recording for high density recording than in the long-wavelength recording so that, in the former case, even an extremely small foreign body adhering to the surface of the tape may cause remarkable increase in the spacing loss resulting in the phenomenon of dropout.

As is explained in the above, the phenomenon of dropout takes place when a tiny foreign body produced in the manufacturing and/or in the course of use of the magnetic recording tape is present on the surface of the tape to increase the spacing between the tape and the magnetic head. Such undesirable foreign bodies on the tape surface are formed by the magnetic particles having fallen off the surface of the magnetic coating layer on the tape due to the deterioration of the coating layer by the repeatedly applied stress in the frequent recording and playing of the recording tape or by the particles of dust or debris of the film base necessarily shaved off during travelling of the tape to be electrostatically attracted on to the surface of the film base and then transferred to the surface of the magnetic coating layer.

In order to prevent the above described drawbacks, in particular, by the latter mechanism, several methods have been proposed including a method of reducing electrostatic charge on the surface by providing an antistatic coating on the surface of the tape reverse to the magnetic coating layer with an antistatic agent or with a coating composition prepared by dispersing an electroconductive powder such as carbon black or graphite powder in an organic binder and a method of providing a protective backing layer to the reverse side surface with a coating composition prepared by dispersing silicon dioxide or other reinforcing filler in an organic binder to decrease shave-off of the film base of the travelling magnetic recording tape.

The above described methods are indeed effective to some extent to prevent gradual increase of the dropout in the repeated use of a magnetic recording tape. The effect of these methods so far obtained is, however, far from satisfactory and it is eagerly desired to develop an improved magnetic recording tape with complete suppression of dropout.

In particular, it has been unexpectedly noted that the method of providing a protective backing layer is not so effective in decreasing the phenomenon of dropout in the early stage of the life of a magnetic recording tape before so many numbers of repeated travelling, i.e. recording and playing, of the tape. It is usual that the coating of the backing layer on the film base is performed after the magnetic coating layer has been provided followed by calendering since, when the order is reversed, i.e. when the backing layer is first provided on one of the surfaces of the film base and then the magnetic coating layer is formed on the other surface followed by calendering, no complete smoothing effect of the surface of the magnetic coating layer can be obtained by the calendering because the ruggedness in the backing layer is transferred or copied to the magnetic coating layer in the calendering.

The binder material for the backing layer is usually a thermosetting resin because it is an essential requirement that the binder material should be strong enough not to cause increase of the phenomenon of dropout even after so many numbers of repeated travelling of the tape regardless of the type of the filler incorporated therein which may be an electroconductive powder such as carbon black and graphite powder or other inorganic particulate materials. In the case of using a thermosetting resin as the binder material of the backing layer, the coating composition for the backing layer is first applied to the surface of the film base followed by winding of the thus coated tape into a roll and then the thermosetting resin is subjected to the curing treatment as on the rolled tape. Needless to say, the backing layer containing the thermosetting resin as formed by the application of a coating composition to the film base has no sufficient mechanical strengths before curing of the resin so that, when the tape is wound up into a roll bringing the backing layer and the magnetic coating layer into direct contact with each other, the particles of the carbon black, graphite powder or other inorganic filler impregnating the backing layer may sometimes be transferred to the surface of the magnetic coating layer in contact with the backing layer before curing. The detailed investigations undertaken by the inventors for the mechanism of the phenomenon of dropout led to a discovery that the phenomena of dropout in playing of the tape and fill-up of the surface of the magnetic head are sometimes attributable to the filler particles transferred from the uncured backing layer to the magnetic coating layer. This is the very reason for the disadvantage that the phenomenon of dropout is not decreased so much as expected at the initial stage of the life of a magnetic recording tape by providing a backing layer to the tape even though the backing layer is considerably effective in suppressing the increase of the dropout after repeated travelling of the tape. In other words, the phenomenon of dropout takes place considerably even at the very beginning stage of the use of a new magnetic recording tape since the tape as prepared per se is not free from certain particulate materials adhering to the surface of the magnetic coating layer as transferred from the backing layer. Presumably, the effect of the backing layer to suppress the increase of the dropout is exhibited only after a number of repeated travelling of the tape with the reinforcing and antistatic effects thereof. The situation may be similar when a thermoplastic resin is used as the binder resin for the backing layer.

SUMMARY OF THE INVENTION

It is therefore an object of the present invention to provide a magnetic recording medium or a magnetic recording tape with which the phenomenon of the dropout can be minimized throughout the life of the tape, i.e. not only after repeated travelling of the tape but also in the very beginning stage of the use of a new tape by virtue of the absence of any foreign bodies on the tape surface at the delivery of the product to the user.

Another object of the invention is to provide a method for the preparation of a magnetic recording tape in which the above described disadvantages and problems in the prior art methods have been removed to eliminate any foreign bodies transferred from the backing layer to the magnetic coating layer in the course of the formation of the backing layer.

The magnetic recording medium or tape of the present invention comprises a film base, a magnetic coating layer provided on one surface of the film base and a backing layer having a surface roughness of 0.1 to 0.6 $\mu$m provided on the other surface of the film base, the backing layer being formed by applying a coating composition containing a filler and a radiation-sensitive curable resin as a binder and subjecting the coating composition on the surface of the film base to curing by irradiation with a high energy radiation.

The method of the present invention accordingly comprises the steps of coating a surface of a film base, having been provided with a magnetic coating layer on the other surface, with a coating composition containing a filler dispersed in the matrix of a radiation-sensitive curable resin as a binder to form a backing layer and then subjecting the backing layer, prior to winding of the tape into a roll, to the irradiation with a high energy radiation to effect curing of the radiation-sensitive curable resin.

The irradiation with a high energy radiation above mentioned may be carried out preferably with electron beams accelerated at a voltage of 100 to 750 kilovolts and the radiation dose absorbed by the backing layer is preferably in the range from 0.5 to 20 Mrad.

DETAILED DESCRIPTION OF THE PREFERRED EMBODIMENTS

Figure 1:
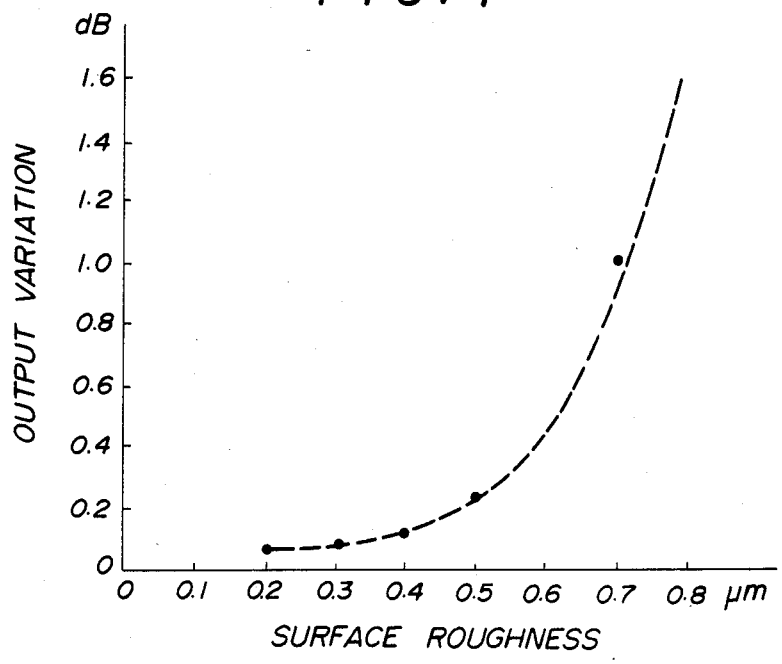
FIG. 1 graphically shows the relationship between the surface roughness in $\mu$m of the backing layer on the magnetic recording tape and the output variation in dB obtained in playing of the tape.

As is described above, the essential feature of the present invention is in the use of a radiation-sensitive curable resin as the binder of the backing layer. That is, the binder resin is blended with carbon black, graphite powder or other filler to form a coating composition and a backing layer is formed on the surface of the film base, reverse to the surface on which the magnetic coating layer has been provided, by coating with the above prepared coating composition which is, either directly or after a surface treatment to control the surface roughness, irradiated with a high energy radiation to effect curing of the radiation-sensitive curable resin by the formation of three-dimensional crosslinks to give a mechanically strong coating film of the backing layer. The tape is wound into a roll only after completion of the radiation curing of the backing layer so that the phenomenon of transfer of the particulate material from the uncured backing layer to the magnetic coating layer never takes place because these layers come into direct contact with each other by winding only after the binder resin has been fully cured.

It is also found that the roughness of the surface of the backing layer is another important parameter to ensure satisfactory performance of a magnetic recording tape. When the surface roughness is excessively coarse, the output variation in playing of the tape is increased so that the surface roughness should not exceed 0.6 $\mu$m in order to keep the output variation below the tolerable upper limit. On the other hand, the surface roughness preferably should not be finer than 0.1 $\mu$m in order to ensure rapid extrusion of the entrapped air in winding of the tape into a roll and also to ensure stable and smooth travelling of the tape in recording and playing.

Thus, the present invention has features in two respects of the prevention of the transfer of any particulate material from the backing layer to the magnetic coating layer in the course of manufacturing and the appropriate surface roughness on the backing layer. These features are essential to effectively suppress the phenomenon of dropout not only in the beginning stage of the use of a new magnetic recording tape but also after repeated travelling of the tape for recording and playing.

The radiation-sensitive curable resin used as a binder for the backing layer in the present invention is defined as a resin having at least two ethylenically unsaturated bonds in a polymeric molecule and capable of being crosslinked or cured by the mechanism of free radical when irradiated with a high energy radiation. As is well known, polymers may be classified into two classes of radiation-degradable ones and radiation-crosslinkable ones and the polymers belonging to the latter class are suitable as the radiation-sensitive curable binder resin in the present invention including, for example, polyethylenes, polypropylenes, polystyrenes, polymers of acrylic acid esters, polyacrylamides, polyvinyl chlorides, polyesters, polyvinyl pyrrolidone rubbers, polyvinyl alcohols, polyacroleins and the like.

Although the above named polymers may be used as such as the radiation-sensitive curable binder resin for the backing layer, a more preferable way from the standpoint of curing velocity is the modification of a thermoplastic resin to impart increased sensitivity to radiation-induced crosslinking. A particular example of the modification to impart increased radiation sensitivity is the introduction of the groups or structures capable of being crosslinked or cured by polymerization when irradiated with a high energy radiation such as the acrylic double bonds as in acrylic and methacrylic acids and esters thereof, allylic double bonds as in diallyl phthalate, double bonds as in maleic acid and derivatives thereof and the like having radical-polymerizability. Other types of ethylenic unsaturation may of course be suitable if provided with crosslinkability by the irradiation with a high energy radiation.

Following are several examples of the thermoplastic resins capable of being modified into radiation-sensitive curable resins. (I) Copolymers of vinyl chloride including copolymers of vinyl chloride, vinyl acetate and vinyl alcohol, copolymers of vinyl chloride and vinyl alcohol, copolymers of vinyl chloride, vinyl alcohol and vinyl propionate, copolymers of vinyl chloride, vinyl acetate and maleic acid and copolymers of vinyl chloride, vinyl acetate and OH-terminated branched-chain alkyl groups. Copolymers of these types are available, for example, from Union Carbide Corp. by the tradenames of VAGH, VROH, VYNC, VYEGX, VERR and the like.

These copolymers can be modified to be imparted with radiation sensitivity by introducing double bonds derived from an acrylic monomer, maleic acid or an allylic monomer by the method to be described hereinbelow. (II) Saturated polyester resins including those obtained by the esterification of a saturated polybasic acid such as phthalic acid, isophthalic acid, terephthalic acid, succinic acid, adipic acid, sebacic acid and the like with one or more of polyhydric alcohols such as ethyleneglycol, diethyleneglycol, glycerin, trimethylolpropane, 1,2-propyleneglycol, 1,3-butanediol, dipropyleneglycol, 1,4-butanediol, 1,6-hexanediol, pentaerithritol, sorbitol, neopenteneglycol, 1,4-cyclohexane dimethanol and the like as well as those resins obtained by modifying the above polyester resins with sulfo groups SO H and converted to the sodium salt thereof available by the tradename of Byron 53S.

These polyester resins may be modified to be imparted with radiation sensitivity by the method to be described hereinbelow. (III) Unsaturated polyester resins having radiation-curable double bonds in the molecular chain of the polyester compound including those resins obtained by the partial substitution of maleic acid for the polybasic acid in the saturated polyester resins in (II) above formulated with a polybasic acid and a polyhydric alcohol to form ester linkages as well as the prepolymers and oligomers thereof.

The polybasic acids and the polyhydric alcohols for the polyester may be the same as in the formulation for the saturated polyester resins given in (II) above and the radiation-curable double bonds may be introduced also by use of fumaric acid instead of maleic acid above mentioned.

The radiation-curable unsaturated polyester resins are prepared in a conventional procedure of condensation reaction in which a mixture of one or more of the polybasic acids including maleic or fumaric acid and one or more of the polyhydric alcohols is heated at 180° to 200° C. under an inert atmosphere of nitrogen gas in the presence of a catalyst to effect the dehydration reaction or dealcoholation reaction followed by temperature elevation to 240° to 280° C. under a reduced pressure of 0.5 to 1 mmHg. The amount of the unsaturated polybasic acid such as maleic and fumaric acids is in the range from 1 to 40% by moles or, preferably, from 10 to 30% by moles in the polybasic acids from the standpoint of obtaining adequate crosslinkability in the manufacturing or radiation-curability. (IV) Polyvinyl alcohol-based resins including polyvinyl alcohols, polyvinyl butyral resins, acetal resins and formal resins as well as the copolymeric resins composed of these monomeric components. These resins may also be modified to be imparted with radiation-sensitivity at the hydroxy groups therein by the method to be described hereinbelow. (V) Epoxy resins and phenoxy resins obtained, for example, by the reaction of bisphenol A and epichlorohydrin or methyl epichlorohydrin sold by Shell Chemical Co. with the tradenames of Epikotes 152, 154, 828, 1001, 1004 and 1007, by Dow Chemical Co. with the tradenames of DEN 431, DER 732, DER 511 and DER 331 and by Dai-Nippon Ink Chemical Co. with the tradenames of Epiclons 400 and 800 as well as the highly polymerized resins of the above named epoxy compounds such as the phenoxy resins sold by Union Carbide Corp. with the tradenames of PKHA, PKHC and PKHH and the copolymers of brominated bisphenol A and epichlorohydrin sold by Dai-Nippon Ink Chemical Co. with the tradenames of Epiclons 145, 152, 153 and 1120.

These resins may also be modified to be imparted with radiation-sensitivity by utilizing the epoxy groups contained therein. (VI) Cellulose derivatives having various molecular weights are also useful as the thermoplastic resin component including, in particular, nitrocelluloses, cellulose acetate butyrates, ethylcelluloses, butylcelluloses, acetylcelluloses and the like as the preferable examples. These cellulose derivatives may also be modified to be imparted water radiation-sensitivity by utilizing the hydroxy groups contained therein.

In addition to the above named thermoplastic resins, several other polymers are also effective including polyfunctional polyester resins, polyether-ester resins, polyvinyl pyrrolidone resins and derivatives thereof such as copolymers of an olefin and vinyl pyrrolidone, polyamide resins, polyimide resins, phenolic resins, spiroacetal resins and acrylic resins of which at least one of the monomeric constituents is an acrylic or methacrylic ester having a hydroxy group.

The toughness of the coating film for the backing layer formed of the coating composition formulated with the above named thermoplastic resins modified to be radiation-sensitive may be further enhanced by blending a thermoplastic elastomer or a prepolymer with the thermoplastic resin. Further enhanced effect is obtained when these elastomers or prepolymers are also modified to be radiation-sensitive in a similar manner to the modification of the thermoplastic resins. Detailed descriptions will be given later of the elastomers and prepolymers to be combined with the above described thermoplastic resins modified to be imparted with radiation-sensitivity.

According to this method, a possibility of rapid curing is obtained even with a non-solvent type resin, i.e. a resin not diluted with a solvent, so that such a resin may be used as the binder in the backing layer.

The coating composition for the backing layer is prepared by blending the above described radiation-sensitive resin as the binder with a filler to be uniformly dispersed in the former by use of a blending machine such as a ballmill. Other types of blending machines may also be used including sand-grinding mills, roller mills, high-speed impeller dispersers, homogenizers, ultrasonic dispersers and the like.

Suitable fillers to be used in the coating composition for the backing layer are classified into two classes of electroconductive ones such as carbon black, graphite powder and the like and non-conductive ones such as calcium carbonate, goethite, talc, kaolin, calcium sulfate, powdered fluorocarbon resins, powders of fluorinated graphites, molybdenum disulfide and the like. Fillers of these two classes may be used in combination according to need. The amount of the filler is in the range from 20 to 100 parts by weight for the electroconductive fillers and from 10 to 300 parts by weight for the non-conductive fillers each per 100 parts by weight of the binder resin. An excessively large amount of the filler is undesirable due to the increased brittleness of the backing layer which causes rather increased dropout contrary to the object of incorporating the filler.

The thus prepared coating composition for the backing layer is applied to the surface of the film base having been provided with the magnetic coating layer on the other surface in a conventional manner to give a thickness of 0.1 to 0.3 μm. Coating of the film base with the coating composition is followed by a surface treatment, e.g. by calendering, to impart a desirable surface roughness in the range from 0.1 to 0.6 μm. The surface roughness of the backing layer is also varied depending on the particle size distribution and amount of the filler in the coating composition, time taken for dispersing the filler in the coating composition and other parameters.

The next step is the irradiation of the backing layer formed of the coating composition by use of a high energy radiation to effect curing of the coating composition. The type of the high energy radiation is not particularly limitative including electron beams accelerated in an electron accelerator, gamma rays from cobalt-60, beta rays from strontium-90, X-rays from an X-ray generator and the like. From the standpoint of easiness in the control of the absorbed radiation dose, assemblage in the line of the coating process and shielding of the ionizing radiations, advantages are obtained by using electron beams accelerated in an electron accelerator as the high energy radiation source.

The characteristics of the radiation should be determined so as to obtain effective curing of the backing layer. For example, the accelerating voltage of the electron beams in the electron accelerator is in the range from 100 to 750 kilovolts or, preferably, from 150 to 300 kilovolts when the penetrability of the electron beams is taken into account. The radiation dose absorbed in the backing layer is controlled in the range from 0.5 to 20 Mrad. Such conditions of the irradiation for curing of the backing layer are readily obtained by use of a low-dose type electron accelerator such as the machines sold by Energy Science Co., U.S.A., under the name of Electrocurtain System. The machine of this type is particularly advantageous in the easiness of the construction of the processing line for tape coating with the machine assembled therein as well as from the standpoint of radiation shielding of the secondary X-ray within the machine.

Conventional electron accelerators such as van de Graaff accelerators widely used in the radiation technology may of course be used. In view of the extremely small thickness of the coating of the backing layer, the curing reaction may be undertaken in some cases with ultraviolet light whereby the desired performance of the backing layer can be exhibited sufficiently.

It is important that the irradiation of the backing layer with the high energy radiation should be performed in an atmosphere of an inert gas such as nitrogen, carbon dioxide, argon, helium and the like. Oxygen should be excluded from the atmosphere for the irradiation as completely as possible since, when the irradiation is performed, for example, in air, the crosslinking reaction is strongly inhibited to retard the curing of the binder resin due to the disadvantageous influence of the ozone and the like active species formed by the irradiation of oxygen on the free radicals in the polymer to contribute to the crosslinking reaction. Accordingly, the concentration of oxygen in the atmosphere for the irradiation with the high energy radiation should not exceed 5% by volume when the atmosphere is kept inert with nitrogen, argon neon, carbon dioxide and the like.

When the curing of the backing layer has been completed in the above described manner, the magnetic recording tape is now ready to be wound into a roll and sent to the subsequent steps of processing.

The magnetic recording tapes to be provided with the backing layer according to the invention include audio tapes, video tapes, computer tapes, endless tapes and the like. In particular, the present invention is very advantageous when applied to the video tapes and computer tapes of which the absence of the phenomenon of dropout is one of the most important performance factors.

Following is the exemplifying description of the elastomers and the prepolymers to be combined with the radiation-sensitive curable resins given before.

(I) Polyurethane elastomers as well as prepolymers and telomers thereof.

Polyurethane elastomers are particularly useful when high abrasion resistance and strong adhesion to polyethylene terephthalate films are desired.

The urethane compounds, i.e. polyurethane elastomers, prepolymers and telomers, include the polycondensation products of an isocyanate compound exemplified by various kinds of polyvalent isocyanates, such as 2,4-toluene diisocyanate, 2,6-toluene diisocyanate, 1,3-xylene diisocyanate, 1,4-xylene diisocyanate, 1,5-naphthalene diisocyanate, 1,3-phenylene diisocyanate, 1,4-phenylene diisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodur L, Desmodur N (products by Farbenfabriken Bayer AG) and the like, with one or more of linear saturated polyesters, such as the polycondensation products of a polyhydric alcohol, e.g. ethyleneglycol, glycerin, diethyleneglycol, trimethylolpropane, 1,4-butanediol, 1,6-hexanediol, pentaerithritol, sorbitol, neopentylglycol, 1,4-cyclohexane dimethanol and the like and a polybasic carboxylic acid, e.g. phthalic acid, isophthalic acid, terephthalic acid, maleic acid, succinic acid, adipic acid, sebacic acid and the like, linear saturated polyethers, such as polyethylene glycol, polypropylene glycol, polytetraethylene glycol and the like, and other kinds of polyesters, such as caprolactam, hydroxy-containing esters of acrylic acid, hydroxy-containing esters of methacrylic acid and the like.

These urethane compounds may be combined as such with the thermoplastic resin modified to be radiation-sensitive. A more advantageous way is, however, that these urethane elastomers are also modified to be radiation-sensitive before they are combined with the thermoplastic resin. Such a modification can be advantageously performed by utilizing the isocyanate groups or hydroxy groups at the molecular chain ends of the polyurethane elastomer which may be reacted with a monomer having acrylic or allylic unsaturation.

(II) Copolymeric elastomers of acrylonitrile and butadiene

The copolymeric prepolymers having hydroxy groups at the molecular chain ends sold by Sinclair Petrochemicals, Inc. with a tradename of Poly BD Liquid Resin, the elastomers sold by Nippon Zeon Co. with a tradename of Hycar 1432J and the like copolymers of acrylonitrile and butadiene are useful as the elastomeric component since they are capable of being crosslinked or polymerized with formation of free radicals from the double bonds in the butadiene constituent when irradiated with a high energy radiation.

(III) Polybutadiene elastomers

Low molecular weight prepolymers having hydroxy groups at the molecular chain ends such as Poly BD Liquid Resin R-15 sold by Sinclair Petrochemicals, Inc. are particularly suitable in respect of the compatibility with the thermoplastic resins. Further advantage is obtained with the above mentioned prepolymers, such as R-15, as a binder when the polymer is modified by the addition reaction of acrylic double bonds with the hydroxy groups at the molecular chain ends to enhance the radiation sensitivity.

Cyclized polybutadienes, such as CBR-M901 manufactured by Japan Synthetic Rubber Co. also exhibit excellent performance when combined with a thermoplastic resin. Cyclized polybutadienes are particularly advantageous as a binder by virtue of the high efficiency in the radiation-induced crosslinking polymerization with the free radicals formed from the unsaturated linkages inherently possessed by the polybutadiene.

In addition to the above described elastomers, several other types of elastomers may be advantageously used such as the copolymers of styrene and butadiene, chlorinated rubbers, acrylic rubbers, isoprene rubbers and cyclized products thereof, such as CIR 701 manufactured by Japan Synthetic Rubber Co., internally plasticized saturated linear polyesters, such as Byron #300 manufactured by Toyo Spinning Co., and the like as the thermoplastic elastomer or prepolymer to be combined with the thermoplastic resin when they are modified to be radiation-sensitive by the treatment described below.

In the following, the magnetic recording media of the invention as well as the manufacturing process thereof are described in further detail by way of examples, which are preceded by the description of the preparation of several radiation-sensitive binder materials.

Preparation 1. Synthesis of an acrylic-modified radiation-sensitive copolymeric resin of vinyl chloride and vinyl acetate.

Into a four-necked flask of 5-liter capacity were introduced 750 g of a vinyl chloride-vinyl acetate copolymeric resin (Vinylite VAGH manufactured by Union Carbide Corp.), 1250 g of toluene and 500 g of cyclohexanone and the mixture was heated to dissolve the resin in the solvent mixture. While keeping the reaction mixture at 80° C., 61.4 g of 2-hydroxyethyl methacrylate adduct of tolylene diisocyanate prepared in the manner as described hereinbelow, 0.012 g of tin octoate and 0.012 g of hydroquinone were added to the reaction mixture and the reaction was continued at 80° C. under an atmosphere of nitrogen until the conversion of the NCO groups had reached 90% or more. After completion of the reaction, the reaction mixture was allowed to cool and diluted by adding 1250 g of methylethylketone.

Preparation of the adduct of 2-hydroxyethyl methacrylate (2HEMA) and tolylene diisocyanate (TDI): into 348 g of TDI taken in a four-necked flask of 1-liter capacity and heated at 80° C. under a nitrogen stream were added dropwise 260 g of 2HEMA containing 0.07 g of tin octoate and 0.05 g of hydroquinone while the temperature of the reaction mixture was controlled in the range of 80 to 85° C. by outwardly cooling the flask. After completion of the dropwise addition of 2HEMA, the reaction mixture was further agitated at 80° C. for additional 3 hours to complete the reaction followed by cooling to give the 2HEMA adduct of TDI in the form of a white paste.

Preparation 2. Synthesis of a radiation-sensitive acrylic-modified polyvinyl butyral resin.

A mixture in a four-necked flask composed of 100 parts by weight of a polyvinyl butyral resin (BM-S manufactured by Sekisui Chemical Co.), 191.2 parts by weight of toluene and 71.4 parts by weight of cyclohexanone was heated to dissolve the resin in the solvent mixture and, after the temperature of the mixture had reached 80° C., 7.4 parts by weight of the 2HEMA adduct of TDI prepared as described above, 0.015 part by weight of tin octoate and 0.015 part by weight of hydroquinone were added thereto and the reaction was performed by agitating the reaction mixture at 80° C. under a nitrogen stream until the conversion of the NCO groups had reached 90% or more. After completion of the reaction, the reaction mixture was allowed to cool and diluted by adding methylethylketone.

Preparation 3. Synthesis of an acrylic-modified radiation-sensitive saturated polyester resin.

A solution formed by dissolving 100 parts by weight of a saturated polyester resin (Byron RV-200 manufactured by Toyo Spinning Co.) in a solvent mixture of 116 parts by weight of toluene and 116 parts by weight of methylethylketone was heated to 80° C. and then admixed with 3.55 parts by weight of the 2 HEMA adduct of TDI prepared as described above, 0.007 part by weight of tin octoate and 0.007 part by weight of hydroquinone and the mixture was heated at 80° C. under a nitrogen stream to effect the reaction until the conversion of the NCO groups had reached 90% or more.

Preparation 4. Synthesis of an acrylic-modified radiation-sensitive epoxy resin.

A solution formed by dissolving 400 parts by weight of an epoxy resin (Epikote 1007 manufactured by Shell Chemical Co.) in a solvent mixture of 50 parts by weight of toluene and 50 parts by weight of methylethylketone with heating was admixed with 0.006 part by weight of N,N-dimethylbenzylamine and 0.003 part by weight of hydroquinone followed by heating up to 80° C. Thereupon, 69 parts by weight of acrylic acid were added dropwise into the reaction mixture to effect the reaction until the acid value of the mixture had dropped to 5 or below.

Preparation 5. Synthesis of an acrylic-modified radiation-sensitive polyurethane elastomer.

Into a reaction vessel were introduced 250 parts by weight of a urethane prepolymer derived from diphenylmethane diisocyanate (MDI) and having isocyanate terminal groups (Nipolan 4040 manufactured by Nippon Polyurethane Co.), 32.5 parts by weight of 2-hydroxyethyl methacrylate, 0.07 part by weight of hydroquinone and 0.009 part by weight of tin octoate and the mixture was uniformized by heating at 80 ° C. Thereafter, 43.5 parts by weight of tolylene diisocyanate were added dropwise thereinto while the temperature of the reaction mixture was kept at 80° to 90 ° C. with outer cooling and the reaction was performed at 80 ° C. until the conversion of the NCO groups had reached 90% or more.

Preparation 6. Synthesis of an acrylic-modified radiation-sensitive polyether having urethane-modified terminal groups.

Into a reaction vessel were introduced 250 parts by weight of a polyether (PTG-500 manufactured by Nippon Polyurethane Co.), 32.5 parts by weight of 2-hydroxyethyl methacrylate, 0.007 part by weight of hydroquinone and 0.009 part by weight of tin octoate and the mixture was uniformized by heating at 80° C. Thereafter, 43.5 parts by weight of tolylene diisocyanate were added dropwise thereinto while the temperature of the reaction mixture was kept at 80to 90 ° C. with outer cooling and the reaction was performed at 80° C. until the conversion of the NCO groups had reached 95% or more.

Preparation 7. Synthesis of an acrylic-modified radiation-sensitive polybutadiene elastomer.

Into a reaction vessel were introduced 250 parts by weight of a hydroxy-terminated low molecular weight polybutadiene (Poly BD Liquid Resin R-15 manufactured by Sinclair Petrochemicals; Inc.), 32.5 parts by weight of 2-hydroxyethyl methacrylate, 0.007 part by weight of hydroquinone and 0.009 part by weight of tin octoate and the mixture was uniformized by heating at 80 ° C. Thereafter, 43.5 parts by weight of tolylene diisocyanate were added dropwise thereinto while the temperature of the reaction mixture was kept at 80° to 90 ° C. with outer cooling and the reaction was performed at 80° C. until the conversion of the NCO groups had reached 95% or more.

EXAMPLE 1

A coating composition for the backing layer of a magnetic recording tape was prepared by uniformly blending 50 parts by weight of carbon black having an average particle diameter of about 81 nm (Asahi HS 500, a product by Asahi Carbon Co.), 40 parts by weight of an acrylic-modified copolymer of vinyl chloride, vinyl acetate and vinyl alcohol prepared in Preparation 1 above, 40 parts by weight of an acrylic-modified polyurethane elastomer prepared in Preparation 5 above and 350 parts by weight of a 1:1 by volume mixture of toluene and methyl isobutyl ketone in a ballmill.

A film base of polyethylene terephthalate having been provided with a magnetic coating layer on one surface was coated with the above prepared coating composition on the other surface to give a coating thickness of about 3 $\mu$m as dried followed by evaporation of the solvents to dryness. Thereafter, the thus formed backing layer was subjected to the irradiation with electron beams in an atmosphere of nitrogen by use of an Electrocurtain-type electron accelerator under the conditions of the accelerating voltage of 150 kilovolts and beam current of 10 mA to give a radiation dose of 10 Mrad absorbed in the layer whereby the backing layer was sufficiently cured.

The film base thus finished on both surfaces was wound into a roll which was cut into slices of tape rolls each having a width of a half inch suitable as a video recording tape. These magnetic recording tapes were subjected to the tests of the output variation and the dropout on a VHS video playing deck.

It was found that the surface roughness of the backing layer formed in the above described manner was dependent on the time in which the dispersing blending of the composition was performed in the ballmill and was coarser with a shorter blending time as a matter of course. FIG. 1 is a graphic showing of the relation-ship between the surface roughness of the backing layer of the tape and the output variation in the playing of the tape. As is clear from this graph, the surface roughness of 0.6 $\mu$m was critical above which the output variation increased rapidly and exceeded a tolerable upper limit to cause fluctuation of the images on the CRT screen reproduced by playing the tape on the VHS video deck. When the surface roughness was in the range from 0.2 to 0.6 $\mu$m, the increase of the dropout was remarkably small even after 200 times of repeated travelling of the tape on the VHS deck and the condition of the tape roll formed by taking up the travelling tape on the reel was satisfactory in each time with very small runout.

EXAMPLE 2

A coating composition was prepared in a ballmill by uniformly blending for 8 hours a mixture composed of 50 parts by weight of goethite having an average particle diameter of about 0.5 $\mu$m, 35 parts by weight of an acrylic-modified copolymer of vinyl chloride, vinyl acetate and vinyl alcohol prepared in Preparation 1 above, 25 parts by weight of an acrylic-modified polyurethane elastomer prepared in Preparation 5 above and 300 parts by weight of a 1:1 by volume mixture of toluene and methylethylketone.

Coating of a film base to form a backing layer and curing of the backing layer by the irradiation with electron beams were carried out in the same manner as in Example 1. The surface roughness of the thus formed backing layer was about 0.2 $\mu$m.

Figure 2:
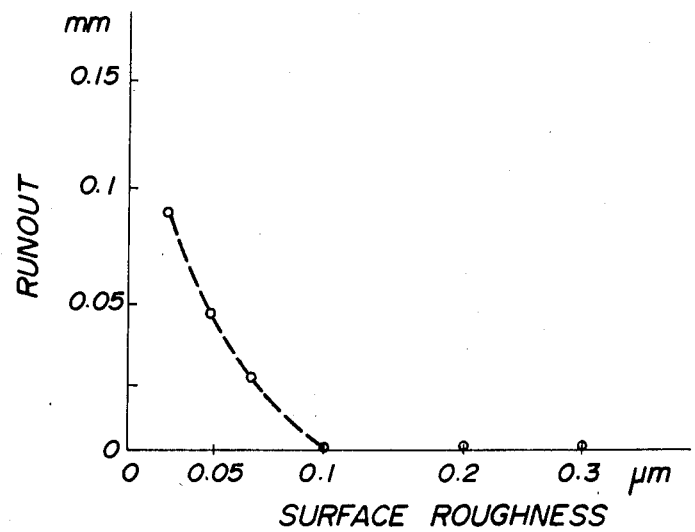
FIG. 2 graphically shows the relationship between the surface roughness in $\mu$m of the backing layer on the magnetic recording tape and the runout in mm caused in travelling of the tape.

For comparison, several other coating compositions were prepared in the same manner as above except that the goethites blended therein had different average particle sizes finer than 0.5 $\mu$m so that the surface roughness of each of the resultant backing layer was 0.1 $\mu$m or finer. Each of the tapes after the radiation curing of the backing layer formed of the coating composition was wound into a roll which was sliced to give rolls of video tapes of each ½ inch width. The thus prepared video tapes were played on a VHS tape playing deck to determine the amount of runout in mm during travelling. The results of the determination of runout are shown in FIG. 2 as a function of the surface roughness. As is clear from this figure, the surface roughness of 0.1 $\mu$m was critical and the tapes having the surface roughness of the backing layer finer than 0.1 $\mu$m were disadvantageous with increasing runout of the tape during travelling while the tapes of the invention having the surface roughness of 0.1 $\mu$m or coarser were satisfactory in respect of small runout and in a good condition of the tape roll in addition to the advantage of the remarkably small phenomenon of dropout not only in the beginning of the test but also even after 200 times of repeated travelling of the tape.

EXAMPLE 3

Three test video tapes Nos. 3 to 5 were prepared each by providing a backing layer on the reverse side surface to the magnetic coating layer with a coating composition of the formulation different from each other as shown below in the table in parts by weight. The procedure for providing the backing layer was substantially the same as in Example 1.

Each of these test tapes was played on the VHS tape playing deck to examine the output variation, the phenomenon of dropout and the condition of the tape roll. The results of the output variation are given in the table together with the surface roughness of the backing layer. The image reproduction on the CRT screen was quite satisfactory almost without fluctuation for each of the test tapes. The satisfactory performance of the tapes was retained even after 200 times of repeated travelling of the tape with very small increase of the dropout and without fluctuation of the screen images. The condition of the tape rolls was also good with small runout.

TABLE

| Test video tape No. | | 3 | 4 | 5 |
|---|---|---|---|---|
| Formulation for coating composition, parts by weight | Kaolin[1] | 50 | — | — |
| | Carbon black[2] | — | 50 | 50 |
| | Vinyl chloride-vinyl acetate-vinyl alcohol copolymer[3] | 40 | — | 60 |
| | Acrylic-modified polyurethane elastomer[4] | 60 | — | 20 |
| | Acrylic-modified polyester resin[5] | — | 80 | — |
| | Solvent | 300[6] | 350[7] | 300[6] |
| Surface roughness, μm | | 0.3 | 0.3 | 0.2 |
| Output variation, dB | | 0.15 | 0.10 | 0.10 |

[1]Average particle diameter 2 μm.
[2]Average particle diameter 81 nm, Asahi HS500 produced by Asahi Carbon Co.
[3]VAGH produced by Union Carbide Corp.
[4]Prepared in Preparation 5
[5]Prepared in Preparation 3
[6]Mixture of methylethylketone and toluene (1:1 by volume)
[7]Mixture of methylisobutylketone and toluene (1:1 by volume)

What is claimed is:

1. A magnetic recording medium which comprises
   (a) a film base,
   (b) a magnetic coating layer provided on a surface of the film base and
   (c) a backing layer provided on the other surface of the film base having a surface roughness from 0.1 to 0.6 μm, said backing layer comprising a matrix of resinous binder cured by the irradiation of a radiation-sensitive copolymeric material with high energy radiation and a filler dispersed in the matrix, the amount of filler being from 20 to 100 parts by weight when the filler is electroconductive and from 10 to 300 parts by weight when the filler is non-conductive, each per 100 parts by weight of said resinous binder said copolymeric material comprising a copolymer of vinyl chloride rendered sensitive to radiation-induced curing by copolymerization with an acrylic monomer.

2. A method for the preparation of a magnetic recording medium comprising a film base, a magnetic coating layer provided on a surface of the film base, and a backing layer provided on the other surface of the film base which comprises:
   coating the surface of the film base reverse to the surface on which the magnetic coating layer has been provided with a coating composition comprising a radiation-sensitive curable copolymeric material as the binder and a filler dispersed in the copolymeric material, the amount of filler being from 20 to 100 parts by weight when the filler is electroconductive and from 10 to 300 parts by weight when the filler is non-conductive, each per 100 parts by weight of said resinous binder; and irradiating the coating composition on the surface of the film base with high energy radiation so as to cure the coating composition into a backing layer having a surface roughness from 0.1 to 0.6 μm on the surface of the film base said copolymeric material comprising a copolymer of vinyl chloride rendered sensitive to radiation-induced curing by copolymerization with an acrylic monomer.

3. The method as claimed in claim 2 wherein the irradiation of the coating composition with a high energy radiation is carried out with electron beams accelerated at an accelerating voltage in the range from 100 to 750 kilovolts.

4. The method as claimed in claim 3 wherein the irradiation of the coating composition with a high energy radiation is carried out to give an absorbed radiation dose in the range from 0.5 to 20 megarads.

5. The method as claimed in claim 2 wherein the filler is a finely divided particulate material selected from the group consisting of carbon black, graphite powder, calcium carbonate, goethite, talc, kaolin, calcium sulfate, fluorocarbon resins, fluorinated graphite and molybdenum disulfide.

6. The method as claimed in claim 5 wherein the filler is carbon black or a graphite powder.

7. The method as claimed in claim 2 wherein the irradiation of the coating composition with the high energy radiation is carried out in an atmosphere with substantial absence of oxygen.

8. The method as claimed in claim 2 wherein the irradiation of the coating composition with a high energy radiation is carried out prior to winding of the magnetic recording medium into a roll.

* * * * *